United States Patent [19]

Frank et al.

[11] 4,429,023
[45] Jan. 31, 1984

[54] MAGNETIC RECORDING MEDIUM

[75] Inventors: Dieter Frank, Naperville; Lincoln D. Metcalfe, Lagrange, both of Ill.

[73] Assignee: Akzona Incorporated, Asheville, N.C.

[21] Appl. No.: 346,308

[22] Filed: Feb. 5, 1982

Related U.S. Application Data

[60] Division of Ser. No. 228,524, Jan. 26, 1981, Pat. No. 4,334,887, which is a continuation of Ser. No. 118,270, Feb. 5, 1980, abandoned.

[51] Int. Cl.$^3$ .............................................. H01F 10/02
[52] U.S. Cl. .................................... 428/694; 428/900
[58] Field of Search ................................ 428/694, 900

Primary Examiner—Bernard D. Pianalto
Attorney, Agent, or Firm—Francis W. Young; Robert F. Green

[57] ABSTRACT

A method for complexing metal oxide particles in an organic medium is disclosed. The method comprises incorporating into said medium an effective amount of a complexing agent of the formula:

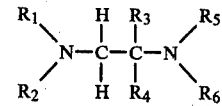

wherein $R_1$ is selected from the group consisting of alkyl and alkenyl groups containing from 4 to 22 carbon atoms, aryl groups containing from 4 to 10 carbon atoms, alkyl and alkenyl groups containing from 4 to 22 carbon atoms substituted with one or more aryl groups containing from 4 to 10 carbon atoms and aryl groups containing from 4 to 10 carbon atoms substituted with one or more alkyl or alkenyl groups containing from 1 to 22 carbon atoms; $R_2$ is selected from the group consisting of hydrogen, $-(CH_2CH_2O)_nH$, wherein n is an integer from 1 to 10, alkyl and alkenyl groups containing from 1 to 22 carbon atoms, aryl groups containing from 4 to 10 carbon atoms, alkyl and alkenyl groups containing from 1 to 22 carbon atoms substituted with one or more aryl groups containing from 4 to 10 carbon atoms and aryl groups containing from 4 to 10 carbon atoms substituted with one or more alkyl or alkenyl groups containing from 1 to 22 carbon atoms; $R_3$ $R_4$ are independently selected from the group consisting of hydrogen, $-CH_3$, and $-CH_2CH_3$; and $R_5$ and $R_6$ are independently selected from the group consisting of hydrogen, $-CH_3$, $-CH_2CH_3$, and $-(CH_2CH_2O)_nH$ wherein n is an integer from 1 to 10.

3 Claims, No Drawings

MAGNETIC RECORDING MEDIUM

This is a division of application Ser. No. 228,524, filed Jan. 26, 1981, U.S. Pat. No. 4,334,887, which is a continuation of application Ser. No. 118,270, filed Feb. 5, 1980, abandoned.

BACKGROUND OF THE DISCLOSURE

This invention relates to a method for complexing metal oxide particles in an organic medium as well as to a method for dispersing or flocculating metal oxide particles in an organic medium. This invention also relates to a magnetic recording medium comprising a magnetic carrier and an improved magnetizable coating provided on said carrier.

Many end use applications require that certain metal oxide particles be complexed to achieve a desired effect such as dispersing the particles in an organic medium. For example, in the recording industry, in order to achieve a useful magnetizable coating on a non-magnetic carrier, it is necessary to finely disperse magnetic pigments in a carrier by means of a binder. Also, in the plastics industry, it is often necessary to uniformly disperse throughout a plastic an amount of a finely divided metal oxide such as antimony trioxide or antimony pentoxide. In order to achieve uniform stable dispersions of such metal oxides in organic media, it is necessary to utilize an effective amount of a complexing agent which in that application functions as dispersing agent. Dispersing agents which have been used in the past include, for example, N-acylsarcosine derivatives, as taught in U.S. Pat. No. 4,153,754. Also, for purposes similar to that disclosed in the aforementioned patent, it is known to use compounds such as N-tallow-1,3-diamino propane, especially in the form of its dioleate salt.

An object of the present invention is to provide improved complexing agents for use in dispersing or flocculating finely divided metal oxide particles in organic media.

The foregoing and other objects will become apparent from the following description of the invention.

SUMMARY OF THE INVENTION

There has now been discovered a method for complexing finely divided metal oxide particles in an organic medium comprising incorporating into said medium an effective amount of a complexing agent of the formula:

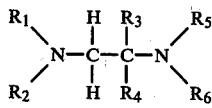

wherein $R_1$ is selected from the group consisting of alkyl and alkenyl groups containing from 4 to 22 carbon atoms, aryl groups containing from 4 to 10 carbon atoms, alkyl and alkenyl groups containing from 4 to 22 carbon atoms substituted with one or more aryl groups containing from 4 to 10 carbon atoms and aryl groups containing from 4 to 10 carbon atoms substituted with one or more alkyl or alkenyl groups containing from 1 to 22 carbon atoms; $R_2$ is selected from the group consisting of hydrogen, $-(CH_2CH_2O)_nH$, wherein n is an integer from 1 to 10, alkyl and alkenyl groups containing from 1 to 22 carbon atoms, aryl groups containing from 4 to 10 carbon atoms, alkyl and alkenyl groups containing from 1 to 22 carbon atoms substituted with one or more aryl groups containing from 4 to 10 carbon atoms and aryl groups containing from 4 to 10 carbon atoms substituted with one or more alkyl or alkenyl groups containing from 1 to 22 carbon atoms; $R_3$ and $R_4$ are independently selected from the group consisting of hydrogen, $-CH_3$, and $-CH_2CH_3$; and $R_5$ and $R_6$ are independently selected from the group consisting of hydrogen, $-CH_3$, $-CH_2CH_3$, and $-(CH_2CH_2O)_nH$ wherein n is an integer from 1 to 10.

The present invention also provided a magnetic recording medium comprising a non-magnetic carrier and a magnetizable coating provided on said carrier, said magnetizable coating comprising a binder and magnetic pigments finely dispersed therein by means of a dispersing agent, said dispersing agent being a compound of the formula:

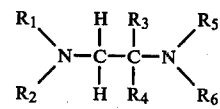

wherein $R_1$ is selected from the group consisting of alkyl and alkenyl groups containing from 4 to 22 carbon atoms, aryl groups containing from 4 to 10 carbon atoms, alkyl and alkenyl groups containing from 4 to 22 carbon atoms substituted with one or more aryl groups containing from 4 to 10 carbon atoms and aryl groups containing from 4 to 10 carbon atoms substituted with one or more alkyl or alkenyl groups containing from 1 to 22 carbon atoms; $R_2$ is selected from the group consisting of hydrogen, $-(CH_2CH_2O)_nH$, wherein n is an integer from 1 to 10, alkyl and alkenyl groups containing from 1 to 22 carbon atoms, aryl groups containing from 4 to 10 carbon atoms, alkyl and alkenyl groups containing from 1 to 22 carbon atoms substituted with one or more aryl groups containing from 4 to 10 carbon atoms and aryl groups containing from 4 to 10 carbon atoms substituted with one or more alkyl or alkenyl groups containing from 1 to 22 carbon atoms; $R_3$ and $R_4$ are independently selected from the group consisting of hydrogen, $-CH_3$, and $-CH_2CH_3$; and $R_5$ and $R_6$ are independently selected from the group consisting of hydrogen, $-CH_3$, $-CH_2CH_3$, and $-(CH_2CH_2O)_nH$ wherein n is an integer from 1 to 10.

DETAILED DESCRIPTION OF THE PREFERRED EMBODIMENTS

As indicated, the present invention provides improved complexing agents. Said complexing agents belong to a class of compounds of the following formula:

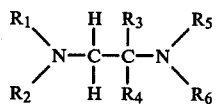

With respect to the foregoing formula, $R_1$ may be selected from the group consisting of alkyl and alkenyl groups containing from 4 to 22 carbon atoms. Preferably $R_1$ is a long-chain alkyl group having from about 8 to about 18 carbon atoms. $R_1$ may therefore be any long-chain alkyl group, such as those derived from naturally occuring fats and oils such as cocoa, tallow, and soya. The $R_1$ group may also represent an aryl group containing from about 4 to about 10 carbon atoms or an alkyl or alkenyl group as defined above substituted with one or more of such aryl groups, such as a phenylstearic group. Likewise the aforementioned aryl group may be substituted with an alkyl or alkenyl group containing from 1 to 22 carbon atoms. The $R_2$ group is independently selected from hydrogen, $-(CH_2CH_2O)_nH$, wherein n is an integer from 1 to 10, and the same group as indicated for $R_1$, but wherein the alkyl and alkenyl groups may contain from 1 to 22 carbon atoms.

When reference is made in the present application to an aryl group, the term should be understood to include any aromatic system meeting the specified criteria, such as having from 4 to 10 carbon atoms. The aryl group may therefore include hetero atoms such as, nitrogen, sufpher, and oxygen as part of the aromatic group.

The $R_3$ and $R_4$ groups are independently selected from the group consisting of hydrogen, $-CH_3$ and $-CH_2CH_3$. Preferably $R_3$ and $R_4$ are both methyl. The $R_5$ and $R_6$ groups are independently selected from the group consisting of hydrogen $-CH_3$, $-CH_2CH_3$, and $-(CH_2CH_2O)_n$, wherein n is an integer from 1 to 11. Preferably, $R_5$ and $R_6$ are hydrogen.

The most preferable class of compounds is represented by the foregoing formula wherein $R_1$ is an alkyl group containing from about 4 to about 22 carbon atoms, preferably from about 8 to about 18, and most preferably it is derived from tallow, $R_2$ is hydrogen, $R_3$ and $R_4$ are both methyl, and $R_5$ and $R_6$ are both hydrogen. The most preferable compound is therefore 1-(N-tallowamino)-2-amino-2-methyl propane.

Other compounds which are useful in the practice of the present invention include 1-(N-dodecylamino)-2-amino-2-methyl propane, 1-(N-phenylstearylamino)-2-amino-2-methyl propane, 1-(benzyl-N-tallow amino)-2-amino-2-methyl propane, 1-(N-morpholino)-2-amino-2-methyl propane, 1-(N-di-n-butyl amino)-2-amino2-methyl propane, 1-(tallow-N-ethanolamino)-2-diethanolamino2-methyl propane, 1-(methyl-N-octadecyl amino)-2-amino-2-methyl propane, 1-(N-n-butyl amino)-2-amino-2-methyl propane, and 1-(N- eicosylamino)-2-amino-2-methyl propane.

The compounds of the present invention may be synthesized in accordance with chemical techniques known to those skilled in the art. One may refer for guidance to A. G. Johnson, JACS. 68, 14 (1946).

To prepare the N-tallow-2-methyl-1,2-propane-diamine utilized in the present invention, one may, for example, react 393 grams of primary tallow amine with 147 grams of nitropropane in a one-liter stainless steel stirred Parr autoclave heated to 90° C. 121 grams of formalin (37%) may be added under pressure and the reaction mixture heated to 90° C. for approximately six hours to obtain 95% of the desired nitro-intermediate. 500 grams of the intermediate may then be reacted with hydrogen utilizing 22.5 grams of nickel catalyst and 35 grams of a filter aid, in a one-liter stainless steel, stirred Parr autoclave. The hydrogenation may be accomplished at 60° C., 1000 psig hydrogen for sever hours. The product may contain approximately 83% of the desired diamine and 15% of the corresponding monoamine.

As used herein and in the appended claims, the term "complexing" is used to mean any chemical, physical or other interaction between the complexing agent of the present invention and the metal oxide particle being complexed to cause a chemical, physical or other association to occur between the complexing agent and the metal oxide particle. The formation of true organo-metallic complexes is thus not necessary.

In the present application and the appended claims the term "dispersing" is meant to include physically stabilizing the metal oxide particles against either settling, in the case of liquid suspensions, or migrating, as in the case of metal oxides which are dispersed throughout a polymeric material. The term "flocculating" is used to mean precipitation, agglomeration or other physical association of the metal oxide particles so as to form a recognized increased density of the metal oxide particles.

The organic medium which is utilized in the present process may vary widely and includes liquid and solid organic substances in which finely divided metal oxide particles are incorporated. Thus, useful organic media may include organic liquids, such as mineral oil, synthetic oils, petroleum oils, and typical organic solvents such as methylethyl ketone, methylisobutyl ketone, and toluene. Of course, mixtures of various organic materials may be utilized as the organic medium for the purpose of practicing the present invention. For example, a mixture 1:1:1 of methylethyl ketone, methylisobutyl ketone, and toluene may be utilized.

With respect to the finely divided metal oxide particles which are useful in the practice of the present invention, typically particles having sizes from about 0.01 micron to about 100 microns are useful in the practice of the present invention when dispersion of the particles is desired. Such particles may have any physical shape, regular or irregular. Thus such particles may be spherical or may be acicular such as $Fe_2O_3$ and $CrO_2$ particles which generally have a length of about 0.1 to 1.0 micron and a thickness of about 0.01 to about 0.2 micron. The type of metal oxide particles utilized is not critical. Thus, for example, the metal oxide particles may be any of the known oxides of iron, nickel, copper, vanadium, molybdenum, uranium, mercury, chromium, magnesium, titanium, and antomony, as well as others.

In the practice of the present invention the complexing agent may exist solely in the form identified by the formula hereinabove. The complexing agent may also exist in a wholly or partially neutralized form. Thus, as the complexing agents of the present invention are diamines, they may be wholly or partially neutralized with acids, preferably fatty acids, such as oleic acid. Thus, for every mole of diamine present, the complexing agent may exist as either the mono- or di- salt thereof. An especially useful dispersing agent appears to be N-tallow-2-methyl-1,2-propane-diamine dioleate.

When the complexing agent is to function as a dispersing agent the actual quantity of dispersing agent utilized for dispersing finely divided metal oxides in any particular organic medium will depend greatly upon many factors such as the size of the metal oxide particles, the type of metal oxide particles, the quantity of metal oxide particles present, and the nature of the organic medium in which the metal oxide particles are to be dispersed. In any event, the amount of dispersing agent present should be an effective amount. By the term "effective amount" there is meant a quantity of dispersing agent sufficient to at least partially stabilize the metal oxide particles in the medium against settling or migration. The amount need not be sufficient to maintain the finely divided metal particles dispersed throughout the organic medium indefinitely, but simply sufficient to increase the stability of the system over that which would otherwise be obtained without the presence of the dispersing agent.

When the complexing agent is to function as a flocculating agent, again the quantity utilized will also depend upon the factors outlined above with respect to dispersing agents. The amount utilized should be an "effective amount" which is meant to indicate a quantity sufficient to cause at least some increased degree of flocculation of the metal oxide particles over that which would otherwise occur in the absence of the dispersing agent.

When the present invention is utilized in the field of magnetic recording media, useful results are achieved. In such an application area it is customary to utilize a magnetic recording medium comprising a non-magnetic carrier as well as a magnetizable coating which is provided on the carrier. The magnetizable coating comprises a binder, as well as a magnetic pigment which is maintained finely divided therein by means of a dispersing agent. A typical carrier is manufactured from a synthetic resin, for example polyester or polyvinyl chloride, but may alternatively be paper, glass or metal. The carrier may have the shape of a tape, plate, disk, or the like. For the purpose of dispersing a magnetic pigment in a binder, it is believed that a suitable quantity of dispersing agent of the present invention is from about 1 to about 10 percent, by weight, calculated on the weight of the magnetic pigment, preferably from about 2 to about 5 percent, by weight. Typical binders which are utilized include polyvinyl chloride, polyvinyl acetate, polyacrylate, polyester, polyester amides, polyurethanes and copolymers of at least two monomers selected from the group consisting of vinyl chloride, vinyl acetate, acrylonitrile, vinyl alcohol, vinyl butyral, and vinylidene chloride. Readily useful binders in particular are polyurethane and partially hydrolyzed copolymers of vinyl chloride and vinyl acetate.

The magnetizable particles present in the binder are conventional and typically are, for example, iron powder, $Fe_2O_3$ particles, and $CrO_2$ particles.

To practice the present invention, by use of a ball mill, one may thoroughly mix the magnetizable particles, the dispersing agent of the present invention, and a part of the binder in a solvent for the binder. The remainder of the binder dissolved in a suitable solvent and a lubricant may then be added and the whole may be further ground in the ball mill for a few hours. Typical solvents for the binder include organic liquids, such as esters, for example ethyl acetate, ethers, for example tetrahydrofuran, ketones, for example methylethylketone, methylisobutyl ketone, and cyclohexanone, hydocarbons, for example, toluene and chlorinated hydrocarbons, for example, 1,2-dichloroethane. Certainly, the mixing of the materials may be accomplished in one step in which all of the ingredients are simultaneously supplied to the ball mill. The quantity of magnetizable particles (pigment) is approximately 60 to 85 percent, by weight, calculated on the overall amount of the magnetizable coating. After thoroughly grinding the dispersion in the ball mill, the larger magnetizable particles may be sieved out and the resulting magnetizable coating provided on the carrier in a uniform layer. The whole structure may then be dried and the solvent evaporated and a recording layer having a thickness, for example, from about 2 to about 10 microns may remain on the carrier. The layer may be hardened, if desired, or may be subjected to a calendering process in which the surface of the layer becomes smoother.

The present invention will describe in further detail in the following non-limiting examples.

EXAMPLE I

In this example the utility of a compound of the present invention, 1-(N-tallowamino)-2-amino-2-methyl propane, as a suspending agent for iron oxide ($Fe_2O_3$) in cosmetic grade mineral oil is demonstrated and compared to the utility of a previously known suspending agent, Sarkosyl NL which chemically is sodium lauryl sarcosinate. As the Sarkosyl NL material is available in a 30% aqueous solution, two prior-art compositions were utilized in the comparison, one representing the material as available in the 30% solution, and the other utilizing Sarkosyl NL which had been first dried to produce a 100% active material. The components in the systems were as follows:

(1) 1% $Fe_2O_3$ (200-400 mesh), 3.33% Sarkosyl NL (30%), 95.67% Mineral Oil.
(2) 1% $Fe_2O_3$, 1% Sarkosyl NL (dried), 98% Mineral Oil.
(3) 1% $Fe_2O_3$ (200-400 mesh), 1% 1-(N-tallowamino)-2-amino-2-methyl propane, 98% Mineral Oil.

Suspensions were first stirred for 48 hours, using a Teflon-coated stirring bar and magnetic stirrer. The suspensions were then stored in sealed jars and not disturbed for the duration. After one day, approximately 90% of the $Fe_2O_3$ in both samples 1 and 2 had settled out, while sample 3 was still in suspension. After 4 weeks duration, approximately 60% of the $Fe_2O_3$ in sample 3 had settled out. Even after 8 weeks duration, not more than 90% of the $Fe_2O_3$ had settled out of sample 3, containing the complexing agent of the present invention.

EXAMPLE II

In accordance with the procedure utilized in Example I, several other complexing agents in accordance with the present invention were utilized in combination with 0.1% $Fe_2O_3$ in mineral oil. The complexing agents utilized and the settling rates are shown in Table I. In Table I the settling rates are given in days and are broken down in accordance with the length of time needed to settle 10%, 50%, and 90%, respectively, of the $Fe_2O_3$ in the dispersion.

EXAMPLE III

Following the procedure of Examples I and II, several complexing agents of the present invention were utilized to complex $CrO_2$ in mineral oil. Table II contains the results obtained in the same manner as in Table I.

EXAMPLE IV

Following the procedure of Examples I and II, several complexing agents of the present invention were utilized to complex $Sb_2O_3$ in mineral oil. Table III contains the results obtained in the same manner as in Table I.

EXAMPLE V

The same procedure as utilized in Example I and II was used to complex $TiO_2$ in mineral oil. The results are shown in Table III in the same manner as in Table I.

TABLE I

| CHEMICAL | % $Fe_2O_3$ | | SETTLING RATES (DAYS) 10% | 50% | 90% |
|---|---|---|---|---|---|
| 1-(N—DODECYLAMINO)-2-AMINO-2-METHYL PROPANE | 0.1% | Mineral Oil | 2 | 8 | >10 |
| 1-(N—PHENYLSTEARYLAMINO)-2-AMINO-2-METHYL PROPANE | 0.1% | Mineral Oil | 3 | >10 | >10 |
| 1-(BENZYL-N—TALLOW AMINO)-2-AMINO-2-METHYL PROPANE | 0.1% | Mineral Oil | 3 | >10 | >10 |
| 1-(N—MORPHOLINO)-2-AMINO-2-METHYL PROPANE | 0.1% | Mineral Oil | <1 | <1 | <1 |
| 1-(N—di-n-BUTYL AMINO)-2-AMINO-2-METHYL PROPANE | 0.1% | Mineral Oil | <1 | 3 | 7 |
| 1-(TALLOW-N—ETHANOLAMINO)-2-DI-ETHANOLAMINO-2-METHYL PROPANE | 0.1% | Mineral Oil | 2 | 8 | >10 |
| 1-(METHYL-N—OCTADECYL AMINO)-2-AMINO-2-METHYL PROPANE | 0.1% | Mineral Oil | <1 | 4 | >10 |
| 1-(N—n-BUTYL AMINO)-2-AMINO-2-METHYL PROPANE | 0.1% | Mineral Oil | <1 | 4 | >10 |
| 1-(N—EICOSYLAMINO)-2-AMINO-2-METHYL PROPANE | 0.1% | Mineral Oil | 2 | 7 | >10 |
| CONTROL | 0.1% | Mineral Oil | <1 | <1 | <1 |

TABLE II

| CHEMICAL | % $CrO_2$ | | SETTLING RATES (DAYS) 10% | 50% | 90% |
|---|---|---|---|---|---|
| 1-(N—DODECYLAMINO)-2-AMINO-2-METHYL PROPANE | 0.1% | Mineral Oil | <1 | 3 | 5 |
| 1-(N—PHENYLSTEARYLAMINO)-2-AMINO-2-METHYL PROPANE | 0.1% | Mineral Oil | <1 | 3 | 5 |
| 1-(BENZYL-N—TALLOW AMINO)-2-AMINO-2-METHYL PROPANE | 0.1% | Mineral Oil | <1 | 3 | 5 |
| 1-(N—MORPHOLINO)-2-AMINO-2-METHYL PROPANE | 0.1% | Mineral Oil | <1 | 1 | 3 |
| 1-(N—di-n-BUTYL AMINO)-2-AMINO-2-METHYL PROPANE | 0.1% | Mineral Oil | <1 | 3 | 5 |
| 1-(TALLOW-N—ETHANOLAMINO)-2-DI-ETHANOLAMINO-2-METHYL PROPANE | 0.1% | Mineral Oil | <1 | 3 | 4 |
| 1-(METHYL-N—OCTADECYL AMINO)-2-AMINO-2-METHYL PROPANE | 0.1% | Mineral Oil | <1 | 3 | 5 |
| 1-(N—n-BUTYL AMINO)-2-AMINO-2-METHYL PROPANE | 0.1% | Mineral Oil | <1 | 3 | 5 |
| 1-(N—EICOSYLAMINO)-2-AMINO-2-METHYL PROPANE | 0.1% | Mineral Oil | <1 | 2 | 4 |
| 1-(N—TALLOWAMINO)-2-AMINO-2-METHYL PROPANE | 0.1% | Mineral Oil | <1 | 2 | — |
| CONTROL | 0.1% | Mineral Oil | <1 | 3 | 5 |

TABLE III

| CHEMICAL | % $Sb_2O_3$ | | SETTLING RATES (DAYS) 10% | 50% | 90% |
|---|---|---|---|---|---|
| 1-(N—DODECYLAMINO)-2-AMINO-2-METHYL PROPANE | 0.1% | Mineral Oil | <1 | 3 | 6 |
| 1-(N—PHENYLSTEARYLAMINO)-2-AMINO-2-METHYL PROPANE | 0.1% | Mineral Oil | 1 | 7 | >19 |
| 1-(BENZYL-N—TALLOW AMINO)-2-AMINO-2-METHYL PROPANE | 0.1% | Mineral Oil | <1 | 3 | 14 |
| 1-(N—MORPHOLINO)-2-AMINO-2-METHYL PROPANE | 0.1% | Mineral Oil | <1 | <1 | 5 |
| 1-(N—di-n-BUTYL AMINO)-2-AMINO-2-METHYL PROPANE | 0.1% | Mineral Oil | <1 | 5 | 18 |
| 1-(TALLOW-N—ETHANOLAMINO)-2-DI-ETHANOLAMINO-2-METHYL PROPANE | 0.1% | Mineral Oil | 1 | 8 | >19 |
| 1-(METHYL-N—OCTADECYL AMINO)-2-AMINO-2-METHYL PROPANE | 0.1% | Mineral Oil | 1 | 8 | >19 |
| 1-(N—n-BUTYL AMINO)-2-AMINO-2-METHYL PROPANE | 0.1% | Mineral Oil | <1 | 3 | 6 |
| 1-(N—EICOSYLAMINO)-2-AMINO-2-METHYL PROPANE | 0.1% | Mineral Oil | <1 | 2 | 5 |
| 1-(N—TALLOWAMINO)-2-AMINO-2-METHYL PROPANE | 0.1% | Mineral Oil | <1 | — | — |
| CONTROL | 0.1% | Mineral Oil | <1 | 3 | 6 |

TABLE IV

| CHEMICAL | % $TiO_2$ | | SETTLING RATES (DAYS) 10% | 50% | 90% |
|---|---|---|---|---|---|
| 1-(N—DODECYLAMINO)-2-AMINO-2-METHYL PROPANE | 0.1% | Mineral Oil | 1 | 6 | 17 |
| 1-(N—PHENYLSTEARYLAMINO)-2-AMINO-2-METHYL PROPANE | 0.1% | Mineral Oil | 1 | 7 | >19 |
| 1-(BENZYL-N—TALLOW AMINO)-2-AMINO-2-METHYL PROPANE | 0.1% | Mineral Oil | 1 | 5 | 17 |
| 1-(N—MORPHOLINO)-2-AMINO-2-METHYL PROPANE | 0.1% | Mineral Oil | <1 | 3 | 5 |
| 1-(N—di-n-BUTYL AMINO)-2-AMINO-2-METHYL PROPANE | 0.1% | Mineral Oil | 1 | 7 | 18 |
| 1-(TALLOW-N—ETHANOLAMINO)-2-DI-ETHANOLAMINO-2-METHYL PROPANE | 0.1% | Mineral Oil | 1 | 8 | >19 |
| 1-(METHYL-N—OCTADECYL AMINO)-2-AMINO-2-METHYL PROPANE | 0.1% | Mineral Oil | 1 | 8 | >19 |
| 1-(N—n-BUTYL AMINO)-2-AMINO-2-METHYL PROPANE | 0.1% | Mineral Oil | 1 | 7 | 15 |
| 1-(N—EICOSYLAMINO)-2-AMINO-2-METHYL PROPANE | 0.1% | Mineral Oil | 1 | 6 | >19 |
| 1-(N—TALLOWAMINO)-2-AMINO-2-METHYL PROPANE | 0.1% | Mineral Oil | 1 | 5 | >19 |
| CONTROL | 0.1% | Mineral Oil | 1 | 5 | >19 |

From the foregoing tables it is evident that some of the complexing agents of the present invention are effective at increasing the dispersion stability of $Fe_2O_3$ in mineral oil over the same system without a dispersing agent, whereas others, 1-(N-morpholino)-2-amino-2-methyl propane, are effective at flocculating $Fe_2O_3$ in mineral oil.

What is claimed is:

1. A magnetic recording medium comprising a non-magnetic carrier and a magnetizable coating provided on said carrier, said magnetizable coating comprising a binder and magnetic pigments finely dispersed therein by means of a dispersing agent, said dispersing agent being a compound of the formula:

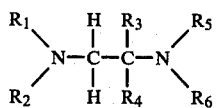

wherein $R_1$ is selected from the group consisting of alkyl and alkenyl groups containing from 4 to 22 carbon atoms, aryl groups containing from 4 to 10 carbon atoms, alkyl and alkenyl groups containing from 4 to 10 carbon atoms, alkyl and alkenyl groups containing from 4 to 22 carbon atoms substituted with one or more aryl groups containing from 4 to 10 carbon atoms and aryl groups containing from 4 to 10 carbon atoms substituted with one or more alkyl or alkenyl groups containing from 1 to 22 carbon atoms; $R_2$ is selected from the group consisting of hydrogen, $-(CH_2CH_2O)_nH$, wherein n is an integer from 1 to 10, alkyl and alkenyl groups containing from 1 to 22 carbon atoms, aryl groups containing from 4 to 10 carbon atoms, alkyl and alkenyl groups containing from 1 to 22 carbon atoms substituted with one or more aryl groups containing from 4 to 10 carbon atoms and aryl groups containing from 4 to 10 carbon atoms substituted with one or more alkyl or alkenyl groups containing from 1 to 22 carbon atoms; $R_3$ and $R_4$ are independently selected from the group consisting of hydrogen, $-CH_3$, and $-CH_2CH_3$; and $R_5$ and $R_6$ are independently selected from the group consisting of hydrogen, $-CH_3$, $-CH_2CH_3$, and $-(CH_2CH_2O)_nH$ wherein n is an integer from 1 to 10.

2. The medium of claim 1 wherein the dispersing agent is selected from the group consisting of 1-(N-tallowamino)-2-amino-2-methyl propane, 1-(N-dodecylamino)-2amino-2-methyl propane, 1-(N-phenylstearylamino)-2-amino-2-methyl propane, 1-(benzyl-N-tallow amino)-2-amino-2-methyl propane, 1-(N-morpholino)-2-amino-2-methyl propane, 1-(N-di-n-butyl amino)-2-amino2-methyl propane, 1-(tallow-N-ethanolamino)-2-diethanolamino2-methyl propane, 1-(methyl-N-octadecyl amino)-2amino-2-methyl propane, 1-(N-n-butyl amino)-2-amino-2-methyl propane, and 1-(N-eicosylamino)-2-amino-2-methyl propane.

3. The medium of claim 1 wherein the dispersing agent is 1-(N-tallowamino)-2-amino-2-methyl propane.

* * * * *